US010891258B2

(12) United States Patent
Sarangi et al.

(10) Patent No.: US 10,891,258 B2
(45) Date of Patent: Jan. 12, 2021

(54) SYSTEMS AND METHODS FOR DE-NORMALIZED DATA STRUCTURE FILES BASED GENERATION OF INTELLIGENCE REPORTS

(71) Applicant: TATA CONSULTANCY SERVICES LIMITED, Mumbai (IN)

(72) Inventors: Ranjan Kumar Sarangi, Bhubaneswar (IN); Sridhar Palla, Bhubaneswar (IN); Manish Kumar, Bhubaneswar (IN); Susant Kumar Bhuyan, Bhubaneswar (IN); Debiprasad Swain, Bhubaneswar (IN); Soumyadeep Ghosh, Kolkata (IN); Padmashwini R, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 293 days.

(21) Appl. No.: 15/419,266

(22) Filed: Jan. 30, 2017

(65) Prior Publication Data
US 2017/0277708 A1 Sep. 28, 2017

(30) Foreign Application Priority Data

Mar. 22, 2016 (IN) .............................. 201621010038

(51) Int. Cl.
G06F 16/17 (2019.01)
G06F 16/22 (2019.01)
(Continued)

(52) U.S. Cl.
CPC ............ G06F 16/17 (2019.01); G06F 16/215 (2019.01); G06F 16/2264 (2019.01);
(Continued)

(58) Field of Classification Search
CPC ......... G06Q 10/0637; G06Q 10/06375; G06Q 10/0639; G06Q 10/06393; G06Q 30/0201;
(Continued)

(56) References Cited

U.S. PATENT DOCUMENTS 7,191,183 B1 * 3/2007 Goldstein .............. G06Q 50/22
707/602
8,140,383 B2 3/2012 Busch
(Continued)

OTHER PUBLICATIONS

Küng et al.: "Business Process Monitoring & Measurement in a Large Bank: Challenges and Selected Approaches", Proceedings of the 16th International Workshop on Database and Expert Systems Application (DEXA '05), pp. 955-961, (2005).

Primary Examiner — David T. Brooks
(74) Attorney, Agent, or Firm — Finnegan, Henderson, Farabow, Garrett & Dunner LLP (57) ABSTRACT

De-normalized data structure files generation systems and methods are provided. The system obtains files from sources wherein each file include records, parses files to validate records and attributes in the records, identifies a set of similar files from the validated files, and append two or more files from the set of similar files to obtain one or more consolidated files. Each of the one or more consolidate files corresponds to a specific category. The system further a predefined logic validation on each of the one or more consolidated files to obtain a logic validated file for each of the one or more consolidated files. Each logic validated file obtained for the one or more consolidated files include validated records. The system further generates a de-normalized data structure file including de-normalized records by merging each of the logic validated files to be used for generating intelligence reports.

9 Claims, 8 Drawing Sheets

(51) Int. Cl.
*G06F 16/28* (2019.01)
*G06F 16/25* (2019.01)
*G06F 16/242* (2019.01)
*G06F 16/215* (2019.01)
*G06Q 10/06* (2012.01)

(52) U.S. Cl.
CPC .......... *G06F 16/244* (2019.01); *G06F 16/254* (2019.01); *G06F 16/283* (2019.01); *G06Q 10/06393* (2013.01)

(58) Field of Classification Search
CPC ............. G06Q 10/06395; G06Q 30/02; G06Q 10/063; G06F 16/254; G06F 16/25; G06F 16/256; G06F 17/2705; G06F 17/2725; G06F 16/283; G06F 16/17; G06F 16/2264; G06F 16/244; G06F 16/215
See application file for complete search history.

(56) References Cited

U.S. PATENT DOCUMENTS

| | | | |
|---|---|---|---|
| 8,290,951 B1 | 10/2012 | Joa et al. | |
| 8,417,715 B1* | 4/2013 | Bruckhaus | G06Q 10/04 707/758 |
| 8,638,343 B2 | 1/2014 | Allyn et al. | |
| 10,417,598 B1* | 9/2019 | Manor | G06Q 30/0201 |
| 2005/0065756 A1* | 3/2005 | Hanaman | G06Q 10/0875 703/2 |
| 2006/0095413 A1* | 5/2006 | Moffat | G06F 16/284 |
| 2007/0112607 A1* | 5/2007 | Tien | G06Q 10/00 705/7.39 |
| 2007/0156673 A1* | 7/2007 | Maga | G06Q 30/02 |
| 2008/0288889 A1 | 11/2008 | Hunt et al. | |
| 2008/0307262 A1* | 12/2008 | Carlin, III | G06F 16/215 714/37 |
| 2009/0187552 A1 | 7/2009 | Pinel et al. | |
| 2010/0131457 A1* | 5/2010 | Heimendinger | G06F 16/283 707/602 |
| 2010/0223244 A1* | 9/2010 | Sinha | G06Q 10/00 707/705 |
| 2010/0318858 A1* | 12/2010 | Essawi | G06F 16/21 714/49 |
| 2011/0093469 A1* | 4/2011 | B'Far | G06N 5/022 707/741 |
| 2011/0173149 A1* | 7/2011 | Schon | G06F 16/24564 706/48 |
| 2012/0005153 A1* | 1/2012 | Ledwich | G06Q 10/06 707/602 |
| 2012/0102002 A1* | 4/2012 | Sathyanarayana | G06F 16/215 707/687 |
| 2012/0246170 A1* | 9/2012 | Iantorno | G06F 8/77 707/748 |
| 2012/0265726 A1* | 10/2012 | Padmanabhan | G06F 16/214 707/602 |
| 2013/0132435 A1* | 5/2013 | Yeung | G06Q 10/063 707/776 |
| 2013/0166515 A1* | 6/2013 | Kung | G06Q 10/063 707/690 |
| 2013/0325788 A1* | 12/2013 | Brown | G06F 16/254 707/602 |
| 2014/0122412 A1* | 5/2014 | Bandekar | G06F 16/254 707/602 |
| 2014/0222712 A1* | 8/2014 | Samaha | G06Q 10/00 705/342 |
| 2014/0279835 A1* | 9/2014 | Li | G06F 16/215 707/602 |
| 2014/0297569 A1 | 10/2014 | Clark et al. | |
| 2015/0347540 A1* | 12/2015 | Singh | G06F 16/2365 707/602 |
| 2016/0267082 A1* | 9/2016 | Wong | G06F 16/164 |
| 2017/0132300 A1* | 5/2017 | Sekar | G06Q 10/067 |

* cited by examiner

SYSTEMS AND METHODS FOR DE-NORMALIZED DATA STRUCTURE FILES BASED GENERATION OF INTELLIGENCE REPORTS

PRIORITY CLAIM

This U.S. patent application claims priority under 35 U.S.C. § 119 to: India Application No. 201621010038, filed on Mar. 22, 2016. The entire contents of the aforementioned application are incorporated herein by reference.

TECHNICAL FIELD

This disclosure relates generally to data processing techniques, and more particularly to systems and methods for de-normalized data structure files based generation of intelligence reports.

BACKGROUND

Data processing techniques play vital role in data analytics. Therefore data processing is of utmost importance for most of entities such as organizations. Challenges remain processing large volume/nature of data on Big Data platforms. For instance, one of the challenges typically faced by such organizations involves a scenario wherein input data is received from multiple sources. Data is captured in both typically structured and unstructured format. Further challenge is in converting the received data in a standard format. Furthermore, data obtained from sources may be incomplete and/or incorrect. It is therefore difficult to determine and validate data before being able to consume the data and derive actionable intelligence. Existing systems and methods performs these operations. However, these operations or tasks are performed in silos, wherein operations happen by retrieving data from databases without a parallel analytics processing. Further, these systems are inefficient since they fail to provide better and proactive guidance to converge on specific actionable intelligence. Furthermore, existing systems and methods fail to provide institutionalized way of determining what problems are, and which problems demand immediate attention. Moreover, because of the complexity in system integration, the existing systems scramble through multiple transactional systems in order to provide accurate information at right time to downstream applications and/or any other third party entities.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides systems and methods for de-normalized data structure files based generation of intelligence reports.

In one embodiment, a processor implemented method is provided. The method comprising (i) obtaining, by a hardware processor, a plurality of files from one or more sources, wherein the one or more files comprises one or more records, and wherein the one or more records comprises one or more attributes; (ii) parsing, by the hardware processor, the plurality of files to validate the one or more records to obtain a plurality of validated files; (iii) identifying, by the hardware processor, a set of similar files from the plurality of validated files; (iv) appending one or more files from the set of similar files to obtain one or more consolidated files, wherein each of the one or more consolidate files corresponds to a specific category; (v) performing, by the hardware processor, a logic validation on each of the one or more consolidated files to obtain a logic validated file for each of the one or more consolidated files, wherein the one or more logic validated files comprises one or more validated records; and (vi) generating a de-normalized data structure file by merging the one or more logic validated files, wherein the de-normalized data structure file comprises a set of de-normalized merged records.

In an embodiment, the step of parsing the plurality of files comprises validating the plurality of files to obtain one or more erroneous records, and storing the erroneous records in one or more error files, wherein each of the one or more error files comprises error description pertaining to the one or more erroneous records. The method may further comprise processing an input comprising a correction of the one or more erroneous files and repeating the steps (i) till (vi) to generate a de-normalized data structure file comprising a set of de-normalized merged records.

The method may further comprise storing the set of de-normalized merged records into a file corresponding to one or more subject areas. The method may further comprise querying the file to generate an aggregated data for one or more measureable key performance indicators; and generating one or more intelligence reports based on the generated aggregated data.

In another embodiment, a system is provided. The system comprising: a memory for storing instructions; one or more communication interfaces; a hardware processor coupled to the memory through the one or more communication interfaces, wherein the hardware processor is configured by the instructions to (i) obtain a plurality of files from one or more sources, wherein the one or more files comprises one or more records, and wherein the one or more records comprises one or more attributes, (ii) parse the plurality of files to validate the one or more records to obtain a plurality of validated files, (iii) identify a set of similar files from the plurality of validated files, (iv) append two or more files from the set of similar files to obtain one or more consolidated files, wherein each of the one or more consolidate files corresponds to a specific category, (v) perform by the hardware processor, a logic validation on each of the one or more consolidated files to obtain a logic validated file for each of the one or more consolidated files, wherein the logic validated file obtained for each of the one or more consolidated files comprises one or more validated records, and (vi) generate a de-normalized data structure file by merging each of logic validated file obtained for each of the one or more consolidated files, wherein the de-normalized data structure file comprises a set of de-normalized merged records.

In an embodiment, the plurality of files are parsed and validated to determine and obtain one or more erroneous records, and store the one or more erroneous records in one or more error files, wherein each of the one or more error files comprises error description pertaining to the one or more erroneous records. In an embodiment, the hardware processor is further configured by the instructions to process an input comprising a correction of the one or more erroneous files, and repeat the steps (i) till (vi) to generate a de-normalized data structure file comprising a set of de-normalized merged records, and store the set of de-normalized merged records into a file corresponding to one or more subject areas.

The hardware processor may be further configured by the instructions to query the file to generate an aggregated data for one or more measureable key performance indicators, and generate one or more intelligence reports based on the generated aggregated data.

In yet another embodiment, one or more non-transitory machine readable information storage mediums comprising one or more instructions is provided. The one or more instructions which when executed by one or more hardware processors causes obtaining a plurality of files from one or more sources, wherein the one or more files comprises one or more records, and wherein the one or more records comprises one or more attributes; (ii) parsing the plurality of files to validate the one or more records to obtain a plurality of validated files; (iii) identifying a set of similar files from the plurality of validated files; (iv) appending one or more files from the set of similar files to obtain one or more consolidated files, wherein each of the one or more consolidate files corresponds to a specific category; (v) performing a logic validation on each of the one or more consolidated files to obtain a logic validated file for each of the one or more consolidated files, wherein the one or more logic validated files comprises one or more validated records; and (vi) generating a de-normalized data structure file by merging the one or more logic validated files, wherein the de-normalized data structure file comprises a set of de-normalized merged records.

In an embodiment, the step of parsing the plurality of files comprises validating the plurality of files to obtain one or more erroneous records, and storing the erroneous records in one or more error files, wherein each of the one or more error files comprises error description pertaining to the one or more erroneous records. The one or more instructions which when executed by one or more hardware processors further causes processing an input comprising a correction of the one or more erroneous files and repeating the steps (i) till (vi) to generate a de-normalized data structure file comprising a set of de-normalized merged records. The one or more instructions which when executed by one or more hardware processors further causes storing the set of de-normalized merged records into a file corresponding to one or more subject areas. The one or more instructions which when executed by one or more hardware processors further causes querying the file to generate an aggregated data for one or more measureable key performance indicators; and generating one or more intelligence reports based on the generated aggregated data.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Some embodiments of this disclosure, illustrating all its features, will now be discussed in detail. The disclosed embodiments are merely exemplary of the disclosure, which may be embodied in various forms.

Before setting forth the detailed explanation, it is noted that all of the discussion below, regardless of the particular implementation being described, is exemplary in nature, rather than limiting.

Referring now to the drawings, and more particularly to FIG. 1 through 8, where similar reference characters denote corresponding features consistently throughout the figures, there are shown preferred embodiments and these embodiments are described in the context of the following exemplary systems and/or methods.

Figure 1:
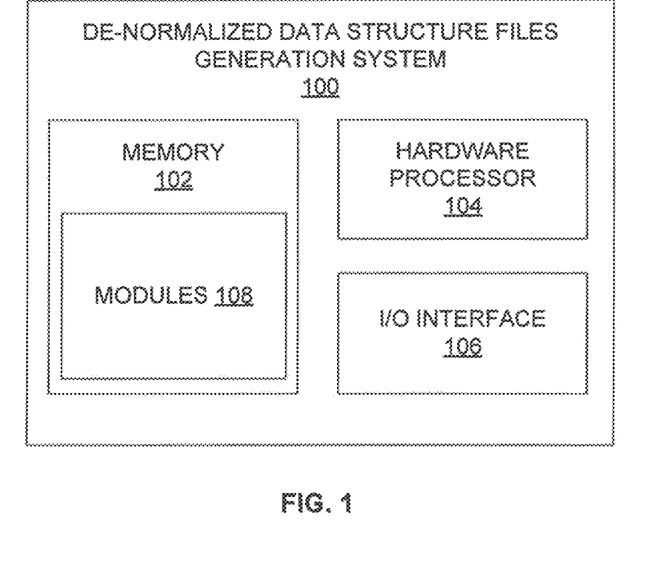
FIG. 1 is a block diagram of a de-normalized data structure files generation system 100 for generation of intelligence reports according to an embodiment of the present disclosure.

FIG. 1 is a block diagram of a de-normalized data structure files generation system 100 for generation of intelligence reports according to an embodiment of the present disclosure. The terms "de-normalized data structure files generation system" and "system" may be interchangeably used herein after. The system 100 may for example, is a secured file transfer protocol server. The system 100 comprises a memory 102, a hardware processor 104, and an input/output (I/O) interface 106. Although the exemplary block diagram and the associated description refers to a memory and a hardware processor, it may be understood that one or more memory units and one or more hardware processors may be comprised in the de-normalized data structure files generation system 100. The memory 102 further includes one or more functional modules 108. The memory 102, the hardware processor 104, the input/output (I/O) interface 106, and/or the modules 108 may be coupled by a system bus or a similar mechanism. The de-normalized data structure files generation system 100 generates de-normalized data structure files based on one or more files received from one or more sources. The one or more sources may comprise, for example but are not limited to, financial institutions, organizations, and the like. The one or more files are parsed and further validated to obtain validated files and determine one or more erroneous files.

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information (e.g., financial transaction data) received from the one or more sources (not shown in FIG. 1) through the one or more networks (not shown in FIG. 1).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 2:
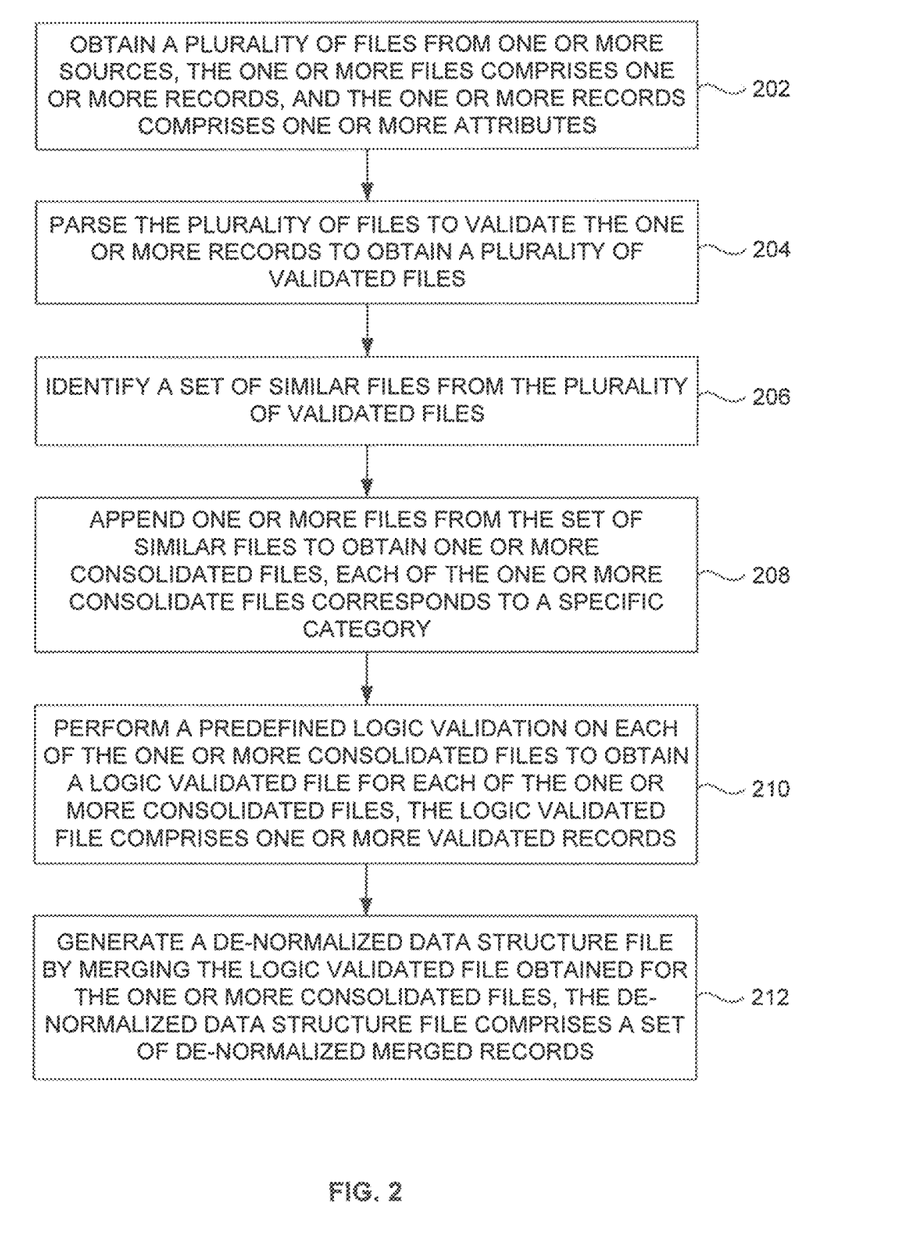
FIG. 2 is a flow diagram illustrating a method of generating de-normalized data structure files for generation of intelligence reports using the de-normalized data structure files generation system of FIG. 1 according to an embodiment of the present disclosure.

FIG. 2, with reference to FIG. 1, is a flow diagram illustrating a method of generating de-normalized data structure files for generation of intelligence reports using the de-normalized data structure files generation system 100 according to an embodiment of the present disclosure. The steps of the method of the present disclosure will now be explained with reference to the components of the system 100 as depicted in FIG. 1. The hardware processor 104 is configured by the instructions stored in the memory 102. The hardware processor 104 when configured by the instructions generates one or more de-normalized data structure files for further generation of intelligence reports (e.g., business intelligence reports) as described hereinafter. In an embodiment, at step 202, the hardware processor 104 obtains a plurality of files from one or more sources. In an embodiment, each of the one or more files comprises one or more records. In an embodiment, each of the one or more records comprises one or more attributes. In an embodiment, the plurality of files may comprise, for example, but are not limited to, flat files in one or more formats such as a Comma Separated Values (CSV) format, abc.xls, .xml, and the like, each file representing one or more subject areas and gets stored in the secured file transfer protocol (SFTP) server for processing.

At step 204, the plurality of files (e.g., flat files) are read (or parsed) to validate the one or more records and the one or more attributes to obtain a plurality of validated files. In an embodiment, each file stored in the SFTP server gets read for validation. For example, the system 100 may implement a data induction platform (DIP) tool on the parsed files and further validates every record and attributes in each of the files to meet one or more criteria. The one or more criteria may comprise validation for every individual field to ascertain that it has the value as expected. In an embodiment, a date field has value in pre-defined date format. For example, 1 Jan. 2016 is an acceptable date value but 30 Feb. 2016 or 2016 Dec. 1 may an unacceptable date value. Further validation may comprise determining whether an integer field actually has an integer value. Furthermore validation may comprise determining whether a character field actually has a value with all characters and length not exceeding a pre-defined (maximum) length. Validation may further include determining entries for mandatory fields. Mandatory fields such as Customer name in Customer master file cannot be null.

Additionally, the system 100 parses and validates the files to determine and obtain one or more erroneous records. In an embodiment, the one or more erroneous records are stored in one or more error files. Each of the one or more error files may comprise error description pertaining to the one or more erroneous records, in an example embodiment. In an embodiment, the records in input files (e.g., flat files) that do not meet the validation criteria as mentioned in above steps are treated as erroneous records. The files post validation may be stored on to computing file server (e.g., Java-based file system such as Hadoop Distributed File System (HDFS).

At step 206, the hardware processor 104 identifies two or more (or a set of similar files) from the plurality of validated files. At step 208, the hardware processor 104 appends two or more files from the set of similar files together to obtain one or more consolidated files, wherein each of the one or more consolidated files corresponds to a specific category (e.g., customer demographic information, account master information, device master information, transaction details, various types of scores, and the like. In an embodiment, two or more similar files are consolidated (or joined one behind the other), using a Java programming language, in the CFS (Hadoop) area where the criteria for determining similar file may be based on a pre-defined naming convention as stated and published in an input file layout format document.

At step 210, the hardware performs a selected logic validation (e.g., a business logic validation) on each of the one or more consolidated files based on the category to obtain a logic validated file for each of the one or more consolidated files. Thus a plurality of business logic validated files may be obtained, wherein each of the plurality of business logic validated files comprises one or more validated records. In other words, once the consolidated files are in CFS zone, then business logic validation may be applied on each of the consolidated files using a programming script such as PIG, and/or a Java programming language. An example of business logic may include but is not limited to, (i) referential integrity between files for example: an account master file having account identifier shall be mapped to account identifier mentioned in an account transaction file. Another example of business logic may include date of transaction in an account transaction file cannot be later than today's date. Yet another example of business logic may include date of transaction in an account transaction file cannot be null. A further example of business logic may include type of account (or an eligible product that can be subscribed by an end customer, or a subscribed product) in an account master file cannot be null.

At step 212, the hardware processor 104 generates a de-normalized data structure file by merging each of logic validated file obtained for each of the one or more consolidated files. In an embodiment, the de-normalized data structure file comprises a set of de-normalized merged records. Below are illustrative examples of normalized data structure files and de-normalized data structure files.

Normalized data structure: This constitutes a set of place holders (fields or columns) for holding various data elements that are attributes of a business process (e.g., Credit approval process, Loan recovery process, and the like) or a business entity (e.g., Credit card Account, e.g., bank employee, Products, and the like). These fields are merged (or combined) under specific groups called tables. Each table maps directly to a business process or a business entity. Between tables, there is a cardinality relationship maintained so as to ensure integrity of data within each table is satisfied as per business requirement. For example, loan recovery process can happen only for an existing Credit account and that it cannot happen for a non-existing account or a non-Credit-account). Normalized data structure is used generally in a transactional system that enables day-to-day core business process (e.g., retail banking, particularly in transactions being performed such as cash withdrawal, cash deposit, making a draft, opening an account, closing an account, approving or rejecting a credit application, and the like). Example of normalized data structure table is illustrated below:

| Employee Table having following columns | Department Table having following columns | Address master Table having following columns | Responsibility master Table having following columns |
|---|---|---|---|
| Employee Identifier | Department Identifier | Address Identifier | Responsibility Identifier |
| Employee Name | Department Name | Address City | Responsibility Description |
| Employee Address Identifier | Department Address | Address State | |
| Employee Parent Department Identifier | Parent Department Identifier | Address Country | |
| Employee Responsibility Identifier | | | |

De-normalized data structure: In this type of arrangement, the place holders or fields from plurality of tables (as present in Normalized structure) are merged together in to a new table called De-normalized data structure or table. Specific routines or programs are executed to join (or combine) two or more normalized tables, extract data in a format as compatible with the de-normalized data structure and then store the extracted data in to this De-normalized new table. Data held in De-normalized table are called de-normalized data. Example of de-normalized data structure as derived from normalized data structure, and is as illustrated below:

| De-normalized Employee Table having following columns |
|---|
| Employee Identifier |
| Employee Name |
| Employee Address Identifier |
| Employee Address Description |
| Employee Department Identifier |
| Employee Department Description |
| Employee Responsibility Identifier |
| Employee Responsibility Description |

On the other hand, the hardware processor 104 processes an input comprising a correction of the one or more erroneous files, and erroneous records. Upon correction, the steps 202 to 212 are repeated to generate subsequent de-normalized data structure files comprising a set of de-normalized merged records. The correction may be performed by a user (e.g., the one or more sources from whom files are received as input). The system 100 or an application that is executed on the system 100 may be integrated with source's computer system, wherein the source can make appropriate corrections and feed the correct files back to the system 100. In such scenarios, a user interface may be presented to the source on his/her computer system, and inputs may be received in terms of corrected data.

Upon generating the de-normalized data structure files, the hardware processor 104 may store the set of de-normalized merged records into a file corresponding to one or more subject areas. In an embodiment, the de-normalized merged records for different business subject areas may be stored in to different files in one or more databases such as a Big-data file system (Hive database), and the like. Examples for the one or more subject areas may comprise, but are not limited to, Customer scoring (e.g., experience, sentiment, net promoter), Customer financial transactions, customer non-financial transactions, Channel (web, phone banking, ATM, contact center, branch visit) utilization by customers, branch operations in terms of Application processing, branch operations in terms of credit approval cycle. The merged records now are holding de-normalized data.

The hardware processor 104 is further configured by the instructions such that the hardware processor 104 queries the one or more files to generate an aggregated data for one or more measureable business key performance indicators, and generates one or more intelligence reports based on the generated aggregated data. Intelligence reports may include business intelligence reports, and/or what if analysis, in one example embodiment. In an embodiment, the de-normalized merged records are queried, using Hive SQL and Java programming, in the Hive database to generate aggregated data for one or more measureable key performance indicators. In an embodiment, the one or more measurable key performance indicators may comprise, but are not limited to, measurable business key performance indicators such as customer count, outstanding balances, transaction count, portfolio value) over different dimensions (e.g., time, region, gender, customer segment, age band, products of bank, channels of service), and the like. The measurement of KPI over different dimensions are presented through examples of aggregate data as below.

1050 customers in the east zone of banking operations. Out of which, 450 are male and 600 are female; 50 are doctors, 100 are engineers, 150 are government employees, rest 750 are self-employed. There are a total of 3000 complaints open as on today. The customers belonging to high value segment, medium value segment and low value segments have raised 500, 700 and 1800 complaints respectively. There are a total of 3000 complaints open as on today wherein Male and female customers have raised 1000 and 2000 complaints respectively. There are a total of 3000 complaints open as on today, wherein Male customers belonging to region 1, region 2 and region 3 have raised 300, 500, 200 complaints respectively, and Female customers belonging to region 1, region 2, region 3 have raised 400, 600, 1000 complaints respectively.

In an embodiment, the generated aggregated data (in on line analytical processing (OLAP) structure) may be stored in to a relational data base management system using SQL scripts. The relational database management system has OLAP data structure (tables and columns) compatible to accommodate aggregated data (examples described above) that can be used as one of the sources to generate intelligence reports (or actionable intelligence). In an embodiment, the intelligence reports comprise values of KPIs over different dimensions.

Figure 3:
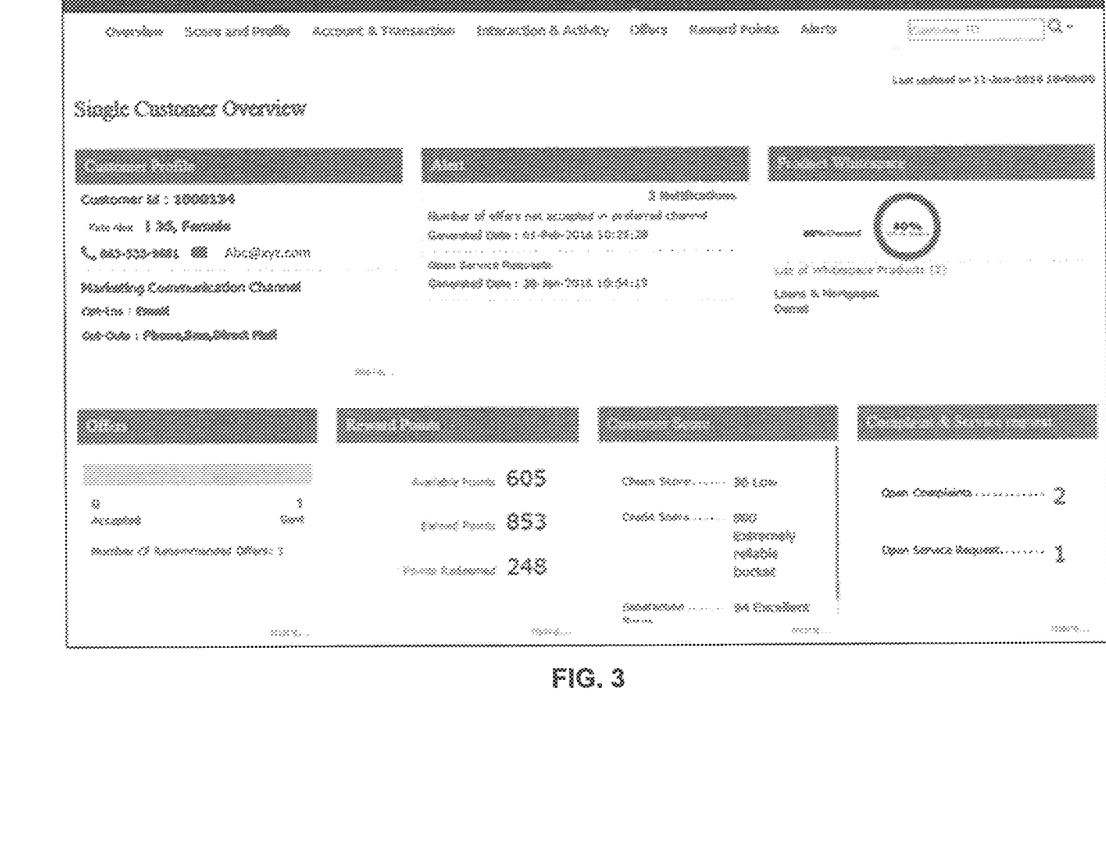
FIG. 3 depicts a user interface view of an intelligence report that illustrates generated aggregated data at lowest level of granularity of entities in a single customer view according to an embodiment of the present disclosure.
Figure 4:
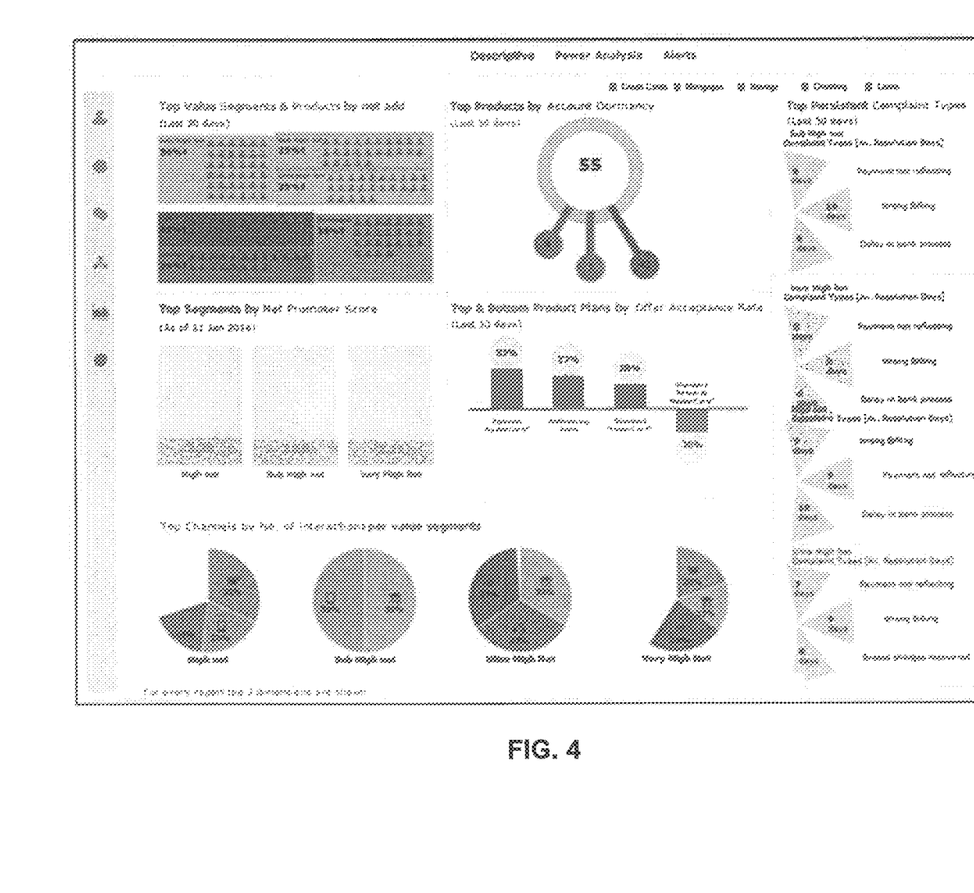
FIG. 4 depicts a user interface view of intelligence report illustrating segment analysis according to an embodiment of the present disclosure.

In another embodiment, the Hive database may be queried, using Hive SQL, the de-normalized merged records to generate data at lowest level of granularity of entities. For example, for every individual customer, wherein query is expected to return summary information for every individual customer. For example: a) finding out number of complaints or service requesting pending for every single customer, b) determining total number of accounts subscribed by a customer and type of each account, c) determining percentage of products (of total available products) that a customer has subscribed, and e) total loyalty points a customer has earned and redeemed in time span and so on. An illustrative example of Hive database being queried and results obtained are depicted in FIG. 3. More particularly, FIG. 3 depicts a user interface view of an intelligence report that illustrates generated aggregated data at lowest level of granularity of entities in a single customer view according to an embodiment of the present disclosure. The single customer view presents customer profile, alerts (e.g., number of offers not accepted, number of open service requests), product whitespace (e.g., number of products owned by a customer such as loans, mortgages, Demat, and the like), offers (e.g., accepted offers, recommended offers to customers, and the like), customer score (e.g., churn score, credit score, satisfaction score, and the like), complaints and service requests (e.g., open complaints, open service requests, and the like). The output of above Hive SQL query, may be written in to Hbase (a Big Data No SQL database) using Hbase import/export programming package and methods, in one example embodiment. FIG. 4, with reference to FIG. 3, depicts a user interface view of intelligence report illustrating segment analysis according to an embodiment of the present disclosure. More particularly, the segment analysis may provide descriptive information (and/or graphical representations) corresponding to one or more of top value segments and products by net add, top segments by net promoter score, top channels by number of interactions per value segments, top products by account dormancy, top and bottom product plans by offer acceptance rates, top persistent complaint types, and the like.

The intelligence reports may be then presented or published over (or through) data services. In an embodiment, data services is a reusable framework that accepts queries in form of (SQL as well as No-SQL) to read from or write to one of the data storage areas as mentioned above (e.g., Hive, OLAP, Hbase). Data services return resultant data in form of JSON (java script object notation) or java arrays back to calling program(s). In an embodiment, data services make use of following languages/scripts to read from/write to different type of data storages (as per instruction provided by calling program(s)): a) SQLs with RDBMS, b) Hive SQL with Hive, c.1.) Hbase import/export or any Apache Application Programming Interface (API) are provided to manipulate in Hbase, c.2.) Additionally and optionally Phoenix wrapper can be used to on top of Apache APIs for ease of programming while reading from/writing to Hbase. Data services can be invoked and executed only after due authentication. The credentials supplied by calling program(s) are validated before responding with results of data services.

Example of Calling Programs or Consuming Applications of the Data Services

Figure 5:
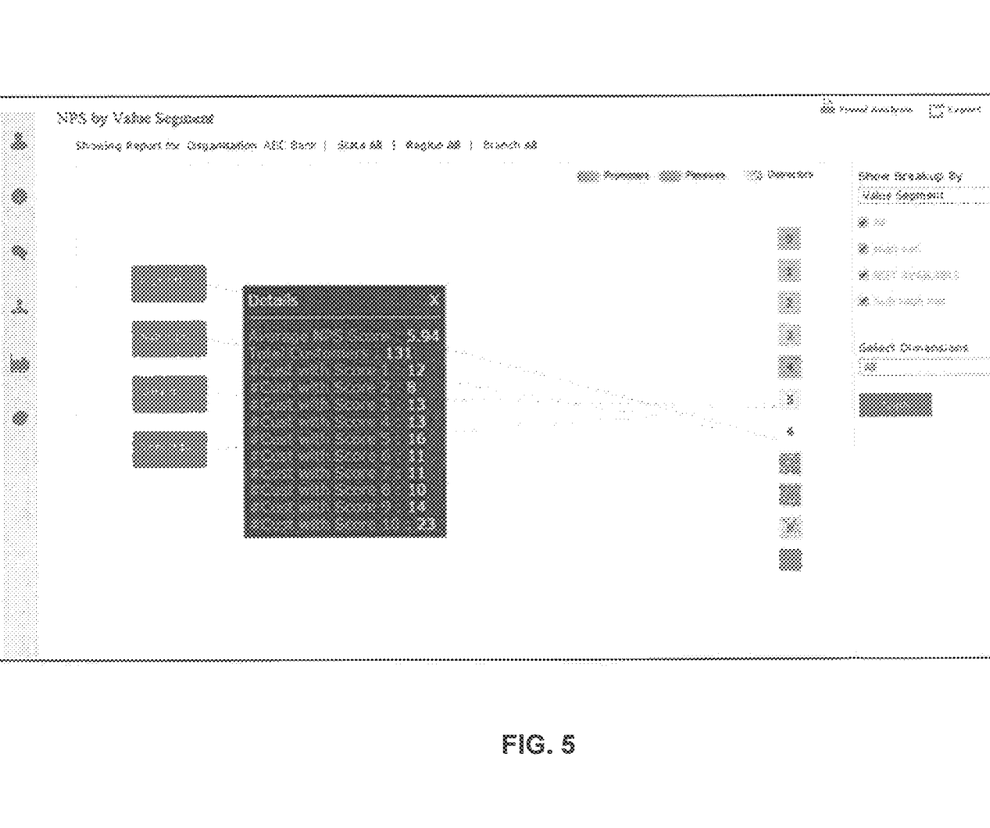
FIG. 5 depicts a user interface view of intelligence report that illustrates Net Promoter Score Analysis according to an embodiment of the present disclosure.
Figure 6:
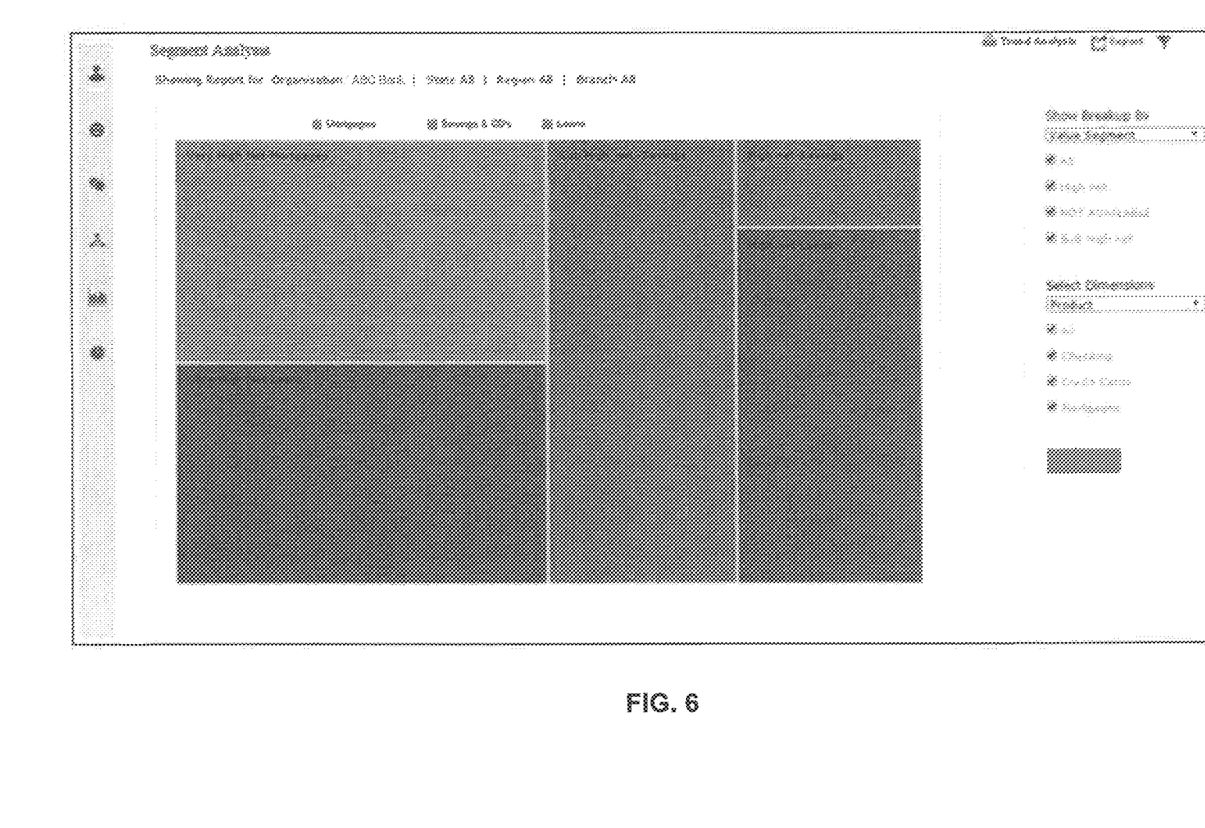
FIG. 6 depicts intelligence report illustrating segment by product analysis according to an embodiment of the present disclosure.
Figure 7:
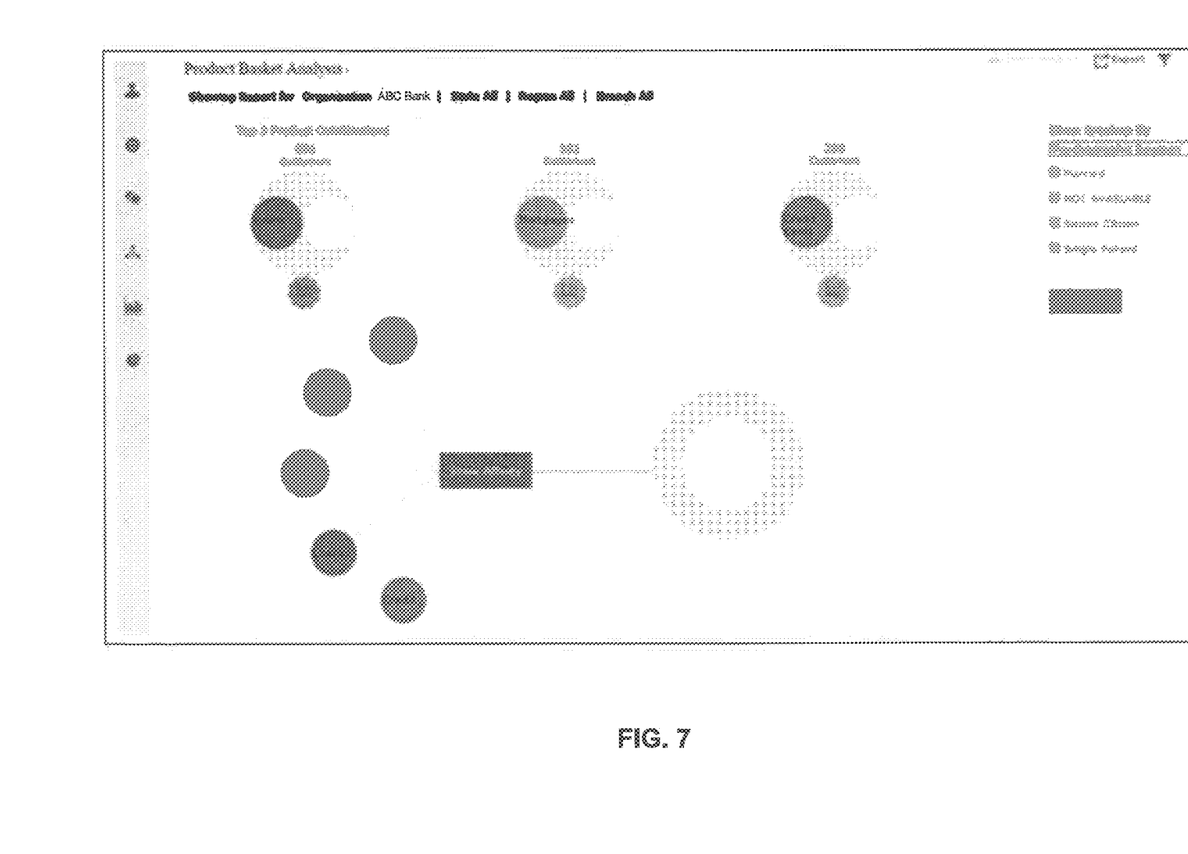
FIG. 7 depicts a user interface view of intelligence report illustrating product basket analysis according to an embodiment of the present disclosure.
Figure 8:
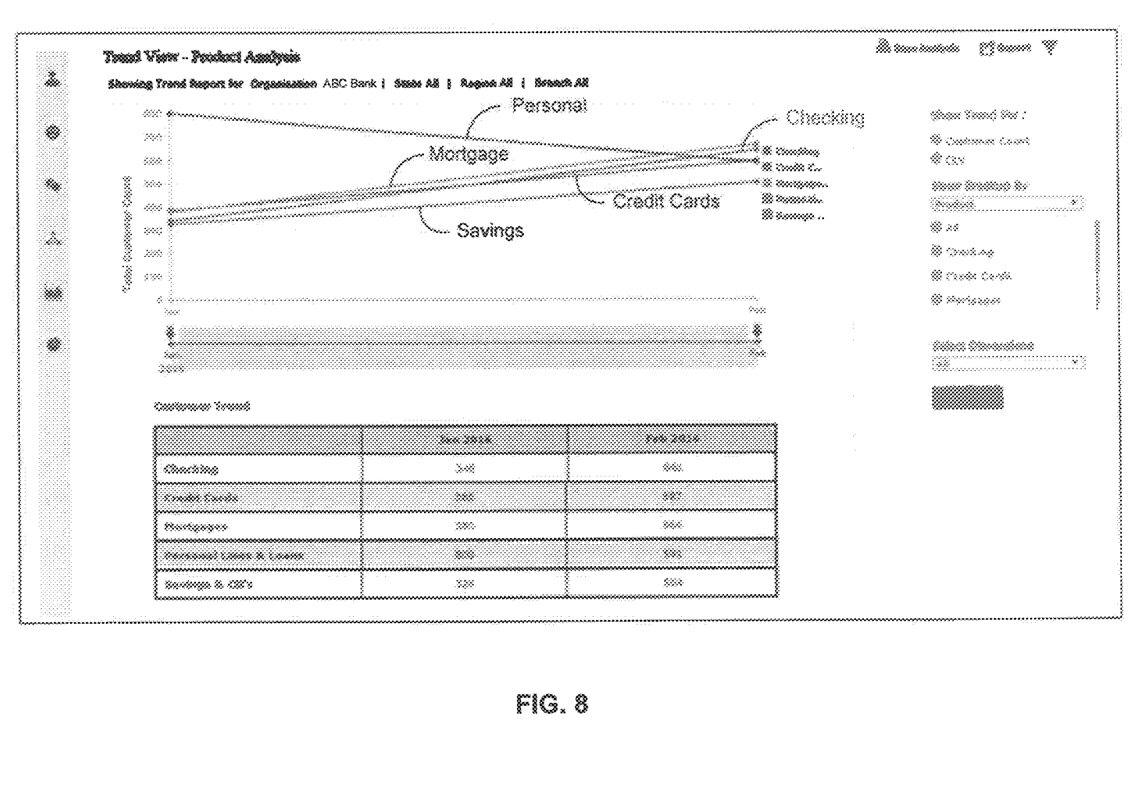
FIG. 8 depicts a user interface view of product analysis illustrating product and customer trends according to an embodiment of the present disclosure.

Front end Screens invoke data services to obtain data and present data in form of canned (pre-defined) intelligence reports. The intelligence report (e.g., business intelligence reports) indicate one or more KPI over different dimensions in form of a) various types of charts, (Pie chart, multivariate chart, bar chat, spider chart etc.), and b) tabular data as depicted in FIGS. 5-8. More particularly, FIG. 5 depicts a user interface view of intelligence report that illustrates Net Promoter Score Analysis according to an embodiment of the present disclosure. More particularly, FIG. 5 depicts Net Promoter Score (NPS) Analysis by value segment. FIG. 6 depicts a user interface view of segment analysis within the customer base view according to an embodiment of the present disclosure. More particularly, FIG. 6 depicts intelligence report illustrating segment by product analysis according to an embodiment of the present disclosure. The segmentation of product analysis may be categorized as for example, but are not limited to, very high net-mortgages, sub-high net savings, high net savings, high net loans, ultra-high net loans. The above categories may be viewed based on one or more selection of dimensions (e.g., products such as credit cards, mortgages, loans, checking) and one or more selection of breakups (e.g., by value segment). FIG. 7 depicts a user interface view of intelligence report illustrating product basket analysis according to an embodiment of the present disclosure. More particularly, FIG. 7 depicts an intelligence report that is indicative of one or more of (i) top products combinations customers have purchased (or have shown interest in purchase such as loan, mortgages, credit cards and the like). The intelligence report of FIG. 7 further depicts affinity towards one or more products (e.g., mortgages, savings, checking, loans, credit cards, and the like) by one or more customers. The graphical representations depicted in FIG. 7 may be presented based on one or more selections of breakup by psychographic segments, in one example embodiment. FIG. 8 depicts a user interface view of product analysis illustrating product and customer trends according to an embodiment of the present disclosure. The trends in products and customers may be visualized based on appropriate parameter/criteria selections (e.g., selecting show trend by customer count or customer lifetime value (CLV), and the like), show breakup by product (e.g., checking, credit cards, mortgages, and the like), dimensions (e.g., all), etc. Alert programs invoke data services to write to RDBMS data structure. Alert programs may also invoke data services to fetch data from different data storage areas (e.g. Hive, Hbase, RDBMS). In an embodiment, alerts may be user defined thresholds set by User, for KPI values under certain conditions (or filter criteria). The system 100 shall keep checking the value of KPI at one or more predetermined intervals based on inputs provided by users. When a value exceeds a predefined threshold, one or more notification messages (e.g., an email or output in form of MS-Excel) may be generated and shared with designated recipient as pre-defined for the alert. In an embodiment, alerts may include, but are not limited to, generating list the customers and their demographic details, under conditions such as a) who belong to region X, age group 30 to 40 years, Self-employed segment when Count of customers falls below 20000. This may be checked every week by the system 100 based on the setting configured in the system 100.

The RDBMS data structure (the OLAP data structure as mentioned above) can be exposed to external users through data cubes. The table and columns of such cube are named appropriately so as to be easily understood by (business) users. One or more columns are retrieved from one or more OLAP tables by desired joining logic, which can be exposed to external users through views. In both cases, end user, even business users, with less technology expertise, can draw their own report with different dimensions and filter conditions. All the data presented through adhoc reporting are read-only for the end user thereby keeping the core database safe from any potential tampering.

The embodiments of the present disclosure enable the de-normalized data structure files generation system 100 to induct transaction of data (e.g., retail banking) and drawing inference out of the same using different data hosting regions (e.g., SFTP server, HDFS, Hive, Postgress (RDBMS), Hbase). This enables the system 100 to be used (or integrated with other systems) in data analytics in other B2C scenarios. For example, B2C may be retail business in brick and mortar and digital commerce, and/or insurance business; data analytics of employees in organizations, educational institutions and citizen expectation management in a city where it can be used for resource planning and management.

The system 100 processes a unique format or layout (e.g., entities and attributes) of input data files that are used for the analysis and drawing business intelligence. This enables the system 100 to provide the processed and validated data (including the de-normalized data structure file comprising the de-normalized merged records) to be reused in IT application in any business domain. The system 100 further processes input data, and produces aggregated data in RDBMS from which specific business intelligence reports can be prepared in the domain of retail banking, and presenting the same in a customer base view. The system 100 further implements custom Java methods to process input data as in flat file, produce and store summarized data, for each single customer, in to Hbase from which analysis and actionable inference can be drawn for a specific customer and presenting the same through a single customer view interface. The embodiments of the present disclosure further enable the system 100 to implement alerts by creating a framework which allows users to set threshold value for a measure (or KPI-Key performance indicator) under specific filter conditions (configurable), and perform checks at predefined intervals and generate notification messages when one or more KPIs breach a predefined threshold value set. Further, system 100 generates custom data services that are published for consumption by consuming applications or components, inside or outside the application hosting boundary, through proper security/credential checks where it can be integrated with applications (e.g., mobile applications for management and as well as end customers/beneficiaries, e-governance, ERP and applications for creating products and policies for large mass of customers/beneficiaries) thus making it a low cost solution.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), BLU-RAY, and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor-implemented method, comprising:
obtaining, by a hardware processor, a plurality of files from one or more sources, wherein said one or more files comprises one or more records, and wherein said one or more records comprises one or more attributes;
parsing, by said hardware processor, said plurality of files from one or more sources to validate said one or more records and implementing a data induction platform (DIP) tool to obtain a plurality of validated files;
identifying, by said hardware processor, a set of similar files from said plurality of validated files, wherein the criteria for determining similar file is based on a pre-defined naming convention as stated and published in an input file layout format document;
appending one or more similar files together, from said set of similar files to obtain one or more consolidated files in a computing file server, wherein each of said one or more consolidated files corresponds to a specific category;
performing, by said hardware processor, a predefined logic validation on each of said one or more consolidated files to obtain a logic validated file for each of said one or more consolidated files, wherein said logic validated file comprises one or more validated records;
generating, a de-normalized data structure file by merging each of said logic validated file obtained for said one or more consolidated files, wherein said de-normalized data structure file comprises a set of de-normalized merged records;
storing said set of de-normalized merged records into a file corresponding to one or more subject areas for each single user;
querying said file to generate an aggregated data for one or more measureable key performance indicators, wherein the key performance indicators comprise measurable business key performance indicators of customer count, outstanding balances, transaction count, portfolio value over different dimensions of time, region, gender, customer segment, age band, products of bank, and channels of service, wherein a value of the key performance indicators are checked at one or more predetermined intervals based on inputs provided by users and an alert is generated when the value of the key performance indicators exceeds the user defined threshold; and
generating one or more intelligence reports using de-normalized merged records wherein the one or more intelligence reports illustrates said generated aggregated data at lowest level of granularity of entities for creating single user view.

2. The processor implemented method of claim 1, wherein parsing said plurality of files comprises validating said plurality of files to obtain one or more erroneous records, and storing said erroneous records in one or more error files, wherein each of said one or more error files comprises error description pertaining to said one or more erroneous records.

3. The processor implemented method of claim 2, further comprising processing an input comprising a correction of said one or more erroneous files and repeating the obtaining, parsing, identifying, appending, and performing to generate a de-normalized data structure file comprising a set of de-normalized merged records.

4. A system comprising:
a memory for storing instructions;
one or more communication interfaces;

a hardware processor coupled to said memory through said one or more communication interfaces, wherein said hardware processor is configured by said instructions to obtain a plurality of files from one or more sources, wherein said one or more files comprises one or more records, and wherein said one or more records comprises one or more attributes, parse said plurality of files from one or more sources to validate said one or more records and implementing a data induction platform (DIP) tool to obtain a plurality of validated files, identify a set of similar files from said plurality of validated files, wherein the criteria for determining similar file is based on a pre-defined naming convention as stated and published in an input file layout format document, append two or more similar files together, from said set of similar files to obtain one or more consolidated files in a computing file server, wherein each of said one or more consolidated files corresponds to a specific category, perform by said hardware processor, a predefined logic validation on each of said one or more consolidated files to obtain a logic validated file for each of said one or more consolidated files, wherein said logic validated file obtained for each of said one or more consolidated files comprises one or more validated records;

generate a de-normalized data structure file by merging each of logic validated file obtained for each of said one or more consolidated files, wherein said de-normalized data structure file comprises a set of de-normalized merged records;

storing said set of de-normalized merged records into a file corresponding to one or more subject areas for each single user;

querying said file to generate an aggregated data for one or more measureable key performance indicators, wherein the key performance indicators comprise measurable business key performance indicators of customer count, outstanding balances, transaction count, portfolio value over different dimensions of time, region, gender, customer segment, age band, products of bank, and channels of service, wherein a value of the key performance indicators are checked at one or more predetermined intervals based on inputs provided by users and an alert is generated when the value of the key performance indicators exceeds the user defined threshold; and generating one or more intelligence reports using de-normalized merged records wherein the one or more intelligence reports illustrates said generated aggregated data at lowest level of granularity of entities for creating single user view.

5. The system of claim 4, wherein said plurality of files are parsed and validated to determine and obtain one or more erroneous records, and store said one or more erroneous records in one or more error files, wherein each of said one or more error files comprises error description pertaining to said one or more erroneous records.

6. The system of claim 5, wherein said hardware processor is further configured by said instructions to process an input comprising a correction of said one or more erroneous files, and repeat the obtaining, parsing, identifying, appending, and performing to generate a de-normalized data structure file comprising a set of de-normalized merged records.

7. One or more non-transitory machine readable information storage mediums comprising one or more instructions which when executed by one or more hardware processors causes:

obtaining, by a hardware processor, a plurality of files from one or more sources, wherein said one or more files comprises one or more records, and wherein said one or more records comprises one or more attributes;

parsing, by said hardware processor, said plurality of files from one or more sources to validate said one or more records and implementing a data induction platform (DIP) tool to obtain a plurality of validated files;

identifying, by said hardware processor, a set of similar files from said plurality of validated files, wherein the criteria for determining similar file is based on a pre-defined naming convention as stated and published in an input file layout format document;

appending one or more similar files together, from said set of similar files to obtain one or more consolidated files in a computing file server, wherein each of said one or more consolidated files corresponds to a specific category;

performing, by said hardware processor, a predefined logic validation on each of said one or more consolidated files to obtain a logic validated file for each of said one or more consolidated files, wherein said logic validated file comprises one or more validated records;

generating a de-normalized data structure file by merging each of said logic validated file obtained for said one or more consolidated files, wherein said de-normalized data structure file comprises a set of de-normalized merged records;

storing said set of de-normalized merged records into a file corresponding to one or more subject areas for each single user;

querying said file to generate an aggregated data for one or more measureable key performance indicators, wherein the key performance indicators comprise measurable business key performance indicators of customer count, outstanding balances, transaction count, portfolio value over different dimensions of time, region, gender, customer segment, age band, products of bank, and channels of service, wherein a value of the key performance indicators are checked at one or more predetermined intervals based on inputs provided by users and an alert is generated when the value of the key performance indicators exceeds the user defined threshold; and generating one or more intelligence reports using de-normalized merged records wherein the one or more intelligence reports illustrates said generated aggregated data at lowest level of granularity of entities for creating single user view.

8. The one or more non-transitory machine readable information storage mediums of claim 7, wherein parsing said plurality of files comprises validating said plurality of files to obtain one or more erroneous records, and storing said erroneous records in one or more error files, wherein each of said one or more error files comprises error description pertaining to said one or more erroneous records.

9. The one or more non-transitory machine readable information storage mediums of claim 8, further comprising processing an input comprising a correction of said one or more erroneous files and repeating the obtaining, parsing, identifying, appending, and performing to generate a de-normalized data structure file comprising a set of de-normalized merged records.

* * * * *